Dec. 2, 1952
E. E. SIVACEK
2,619,668
WINDSHIELD WIPER MECHANISM
Filed April 19, 1947
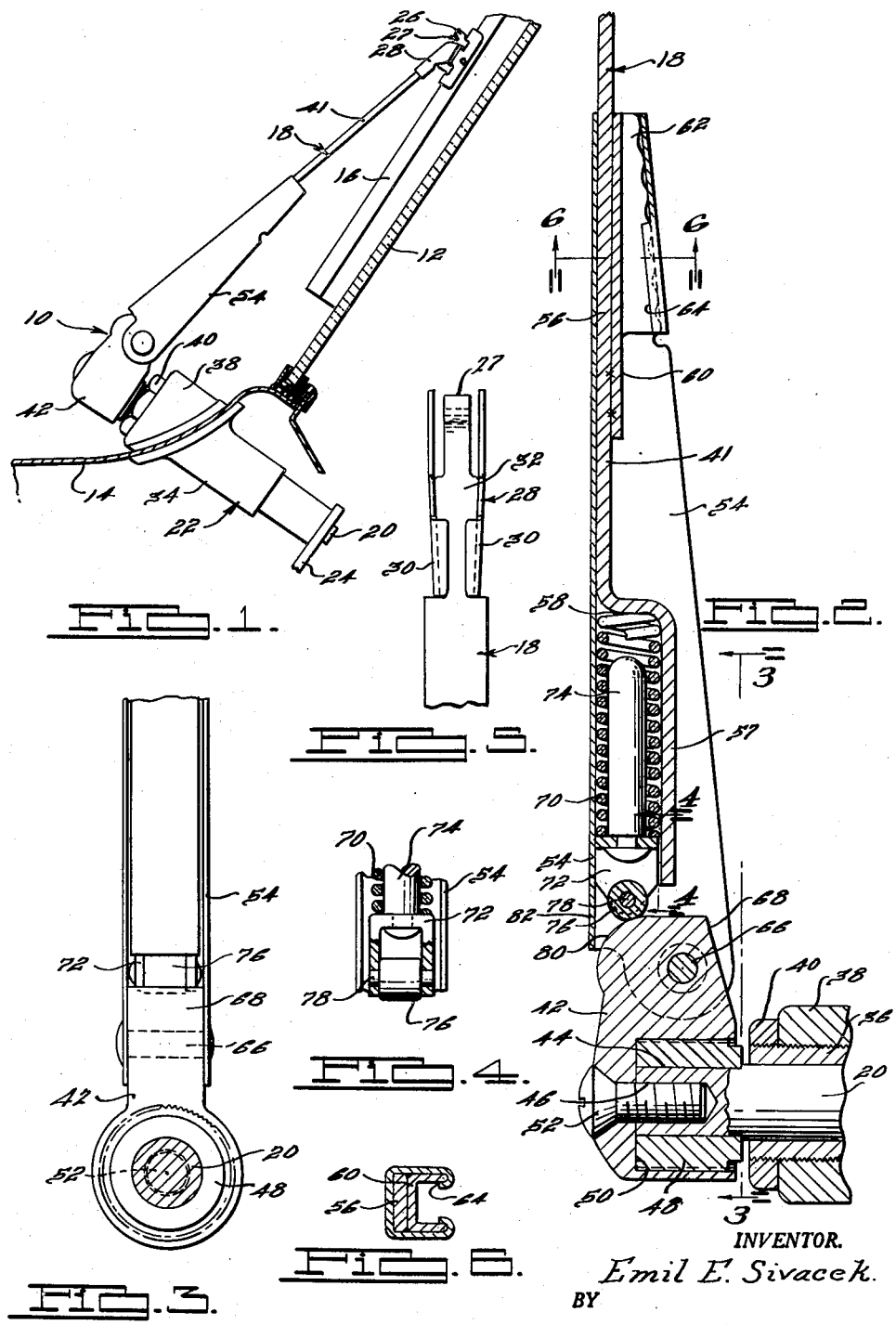
INVENTOR.
*Emil E. Sivacek.*
BY
*Harness, Dickey, + Pierce*
ATTORNEYS.

Patented Dec. 2, 1952

2,619,668

UNITED STATES PATENT OFFICE 2,619,668

WINDSHIELD WIPER MECHANISM

Emil E. Sivacek, Ann Arbor, Mich., assignor to King-Seeley Corporation, Ann Arbor, Mich., a corporation of Michigan Application April 19, 1947, Serial No. 742,565

6 Claims. (Cl. 15—255)

The present invention relates to windshield wiper systems and more particularly to improved wiper carrying arms.

The principal objects of the invention are to provide an improved wiper arm which is simple in construction, economical of manufacture and assembly, and reliable and efficient in operation; to provide an improved wiper arm which is effective, within its normal operating limits, to maintain a substantially uniform pressure between the wiper blade and the windshield; to provide such a mechanism having improved cam means associated therewith to control the moment effective to urge the wiper carrying arm towards the windshield; to provide an improved mechanism of the above generally indicated type in which the moment effective to urge the arm towards the windshield is substantially uniform within the normal limits of operation of said windshield wiper, and in which such moment is reduced to zero when said wiper is pivoted away from the windshield to a retracted position; and to provide an improved mechanism of the above indicated type having an improved spring mechanism and in which the arm conceals and cages the spring mechanism.

With the above as well as other and more detailed objects in view, which will appear from a consideration of the following description and the appended claims, a preferred but illustrative embodiment of the invention is illustrated in the accompanying drawings, throughout the several views of which corresponding reference characters are used to designate corresponding parts, and in which:

Figure 1 is a view in vertical section through the cowl and windshield portions of a vehicle, showing in elevation, a preferred embodiment of the invention;

Fig. 2 is a broken view in central vertical section of the windshield wiper construction illustrated in Fig. 1;

Fig. 3 is a view in vertical section taken along the line 3—3 of Fig. 2;

Fig. 4 is a broken view in vertical section taken substantially along the line 4—4 of Fig. 2;

Fig. 5 is an enlarged broken view in elevation of the outer end portion of the arm showing the fitting attached thereto; and Fig. 6 is a view in transverse section taken along the line 6—6 of Fig. 2.

It will be appreciated from a complete understanding of the present invention that, in a generic sense, the improvements thereof may be embodied in windshield wiper systems of various different designs, arranged for use in connection with various different vehicles. A preferred application of the invention is in connection with so-called cowl mounted wiper systems and in an illustrative but not in a limiting sense, the invention is so disclosed herein.

Referring to the drawings, the illustrated windshield wiper mechanism 10 is shown mounted on a vehicle provided with a usual rearwardly inclined windshield 12 and a conventional cowl 14. The wiper mechanism 10 comprises generally a wiper blade 16 connected to one end of an arm 18, which is driven, through an operative connection at its other end, by a wiper actuating shaft 20, mounted in predetermined relation to the windshield 12 by a swivel 22 supported in the cowl. The shaft 20 may be operated manually or by any suitable motive mechanism through the link 24.

The wiper blade 16 may be mounted on the arm 18 by any suitable arm to blade connector, such for example, as the connector generally indicated at 26 and illustrated and described in detail in applicant's copending application, Serial No. 742,814 filed April 21, 1947. A hook 27 is integrally formed on the associated end of the arm 18 for engaging the connector 26. A fitting 28 cooperates with the connector 26, in the manner described in said application and is secured to the arm 18 adjacent the hook 27, by tightly folding the side portions 30 of the fitting, about a tapered end portion 32 integrally formed on the arm, as illustrated in Fig. 5.

The swivel 22, on which the wiper actuating shaft is supported, may be of any suitable construction. For present purposes, it is sufficient to say that it includes an inner tubular bearing member 34 having a sleeve 36 formed thereon which extends forwardly through the cowl and through an outer tubular bearing member 38, and receives a nut 40 on its outer end for maintaining the swivel elements in assembled relation.

The arm 18 is articulated, and is composed of the elongated outer blade carrying section 41 and a shaft receiving or socket member 42. The outer end of shaft 20 carries, preferably with a press fit, a cylindrical drum 48. The drum 48 is received in a cylindrical socket 50 formed in the socket member 42 and has its external surface longitudinally serrated to cooperate with corresponding longitudinally extending serrations formed internally of the socket 50 to provide a non-rotative driving connection between the drum and the socket member 42. Member 42 is locked to drum 48 by a screw 52, which passes through the base of socket 50 into the tapped hole 46 formed in the shaft. The outer arm section 41 is connected to the socket member 42 through a channel-shaped arm holder 54, the flanges of which taper longitudinally of the holder from a relatively deep channel section at the end thereof which is connected to the member 42, to a relatively shallow channel section at its opposite end. The section 41 may be, and preferably is, formed of flat strip metal of a width substantially equal to the internal width of the web of the holder 54. A substantial length of the section 41 is received within the holder 54, a portion 56 thereof extending along the web of the holder 54 in contact therewith and the inner end portion 57 being bent away from said web and extending generally parallel and in spaced relation thereto and cooperating with the channel-shaped holder 54 to define a spring cage for a purpose hereinafter described.

The holder 54 is secured to the arm section 41 through a stiffener 60 which extends along and is welded to the portion 56 of the section 41 and which includes a channel-shaped portion, the flanges 62 of which are tapered to correspond to the general taper of the holder flanges. The outer edges of the flanges 62 are scalloped as clearly seen in Fig. 2, and the adjacent holder flanges are of substantially greater depth than the flanges 62 and have their outer end portions 64 folded or crimped thereover.

The opposite or deep channel end of the holder 54 is mounted on the member 42 for pivotal movement about an axis extending transversely of the shaft 20 by a pivot pin 66 extending through the flanges of the holder and through a radially extending projection 68 integrally formed on the socket member 42 and disposed between said flanges.

The previously mentioned spring cage houses and completely encloses a coil spring 70 which is employed to resiliently urge the outer section 41, and consequently, the blade 16, toward the windshield. For this purpose, one end of the spring 70 engages a U-shaped roller frame 72 which is slidable in, and provides a closure for, spring cage 58 at the end thereof adjacent the socket member 42. Lateral support for the spring, in addition to that provided by the cage walls may be, and preferably is, provided by a cylindrical spring guide 74, carried by the frame 72, and extending axially inwardly of the spring.

A cylindrical roller 76 is rotatably supported in the frame 72 on a pin 78 disposed generally parallel to the pivot pin 66. The roller engages a cam surface 80 formed on the projection 68 and rolls therealong during pivotal movement about pin 66, of the arm section 41, relative to the shaft 20. It will be appreciated that the effective force of the spring and the effective lever arm thereof may be varied by altering the shape of the cam surface 80 and its disposition relative to the pivot pin 66. In the preferred embodiment illustrated, the surface 80 is a segment of a cylinder, the axis of which is parallel to the pin 66 and spaced axially outwardly of the shaft 20 relative thereto.

This construction of the surface 80 will be seen to produce a progressive compression of the spring upon pivotal movement of the arm section 41 outwardly, or to the left as illustrated in Fig. 2. At the same time, this progressive increase in spring force is largely, if not entirely, compensated for by a corresponding progressive reduction of the effective lever arm, measured, of course, from the axis of the pivot pin 66 to a line normal to the surface 80 at the point of contact by the roller 76. For this reason, throughout the small ranges of pivotal movement of the arm relative to the shaft, encountered in normal windshield wiper operation, the pressure of the wiper against the windshield is substantially constant.

The limiting position to which the arm section 41 may be pivoted outwardly is determined by the engagement of the web portion of the holder 54 with the socket member 42. It will be appreciated that the holder 54 and the socket member 42 may be so proportioned that at the limiting position any of the following three conditions exists: (1) there is a moment urging the arm toward the windshield; (2) there is no moment because the effective force of the spring acts through the pivot point of the arm; or (3) there is a moment operating to hold the arm in the limiting position, the line of action of the effective force of the spring having passed over the pivot point of the arm. In the construction shown in the drawing, there is, at the limiting position to which the arm section 41 may be pivoted, a small moment urging it toward the windshield. By relieving the web portion of the holder 54 to approximately the point indicated by the reference numeral 82 in Fig. 2, the construction may be modified to one in which there is a small moment effective to hold the arm section 41 in the limiting or retracted position.

While only one specific embodiment of the invention has been illustrated and described in detail, numerous modifications and changes may be made without departing from the generic spirit of the invention and from the scope of the appended claims.

What is claimed is:

1. In a windshield wiper mechanism, a shaft engaging member adapted to be operatively connected to an associated wiper actuating shaft, an arm pivotally connected to said shaft engaging member and adapted to carry an associated wiper blade, and moment producing means operable to produce a moment urging said arm member in one direction in a plane which includes the axis of said shaft, said arm member including an elongated element and a channel element mounted on said elongated element and having a web portion, said elongated element extending along the web portion of said channel element and having a portion offset therefrom and cooperating with said channel element to provide a spring cage opening toward said shaft engaging member, said means including spring means disposed and substantially concealed within said cage and effective to act against said shaft engaging member and urge said arm member in said one direction.

2. In a windshield wiper mechanism, a shaft engaging member adapted to be operatively connected to an associated wiper actuating shaft, an arm member pivotally connected to said shaft engaging member and adapted to carry an associated wiper blade, and moment producing means operable to produce a moment urging said arm member in one direction in a plane which includes the axis of said shaft, said arm member including an elongated element and a channel element mounted on said elongated element and pivotally connected to said shaft engaging member said channel element having a web portion, said elongated element extending along the web portion of said channel element and having a portion offset therefrom and cooperating with said channel element to provide a spring cage opening towards said shaft engaging member, said means including spring means disposed and substantially concealed within said cage and effective to act against said shaft engaging member to urge said arm member in said one direction.

3. In a windshield wiper mechanism, a shaft engaging member adapted to be operatively connected to an associated wiper actuating shaft, an arm pivotally connected to said shaft engaging member and adapted to carry an associated wiper blade, and moment producing means operable to produce a moment urging said arm member in one direction in a plane which includes the axis of said shaft, said arm member including an elongated element and a channel element mounted on said elongated element and having a web portion, said elongated element extending along the web portion of said channel element and having a portion offset therefrom and cooperating with said channel element to provide a spring cage opening toward said shaft engaging member, said means including a coil spring housed within said cage and seated against said elongated member and acting against said shaft engaging member to urge said arm member in said one direction.

4. In a windshield wiper mechanism, a shaft engaging member adapted to be operatively connected to an associated wiper actuating shaft, an arm member pivotally connected to said shaft engaging member and adapted to carry an associated wiper blade, and moment producing means operable to produce a moment urging said arm member in one direciton in a plane which includes the axis of said shaft, said arm member including a channel portion having a web portion and an element secured to said channel portion and having a portion offset from said web portion and co-operating with said channel portion to provide a spring cage opening towards said shaft engaging member, said means including cam means formed on said shaft engaging member, cam engaging roller means including a channel-shaped roller frame slidably mounted in the end of said cage opening towards said shaft engaging member and a roller mounted in said frame and adapted to move along said cam means, and a spring disposed within said cage and engaging said roller means to urge the latter along said cam means to thereby urge said arm member in said one direction.

5. In a windshield wiper mechanism, a shaft engaging member adapted to be operatively connected to an associated wiper actuating shaft, an arm member pivotally connected to said shaft engaging member and adapted to carry an associated wiper blade, and moment producing means operable to produce a moment urging said arm member in one direction in a plane which includes the axis of said shaft, said arm member including a channel portion and a portion said arm member including a channel portion having a web portion and an element secured to said channel portion and having a portion offset from said web portion and cooperating with said channel portion member, said means including a cylindrical cam formed on said shaft engaging member, a roller frame mounted in and slidably fitting the end of said cage opening toward said shaft engaging member, a roller mounted in said frame and adapted to move along said cam, and a spring disposed within said cage and engaging said frame to move said roller along said cam to thereby urge said arm in said one direction, said spring being enclosed on all sides by said channel portion of said arm, said element secured to said channel portion, and said roller frame.

6. In a windshield wiper mechanism, a shaft engaging member adapted to be operatively connected to an associated wiper actuating shaft and having a cylindrically shaped cam formed thereon, an arm member pivotally connected to said shaft engaging member and adapted to carry an associated wiper actuating blade, said arm member including an elongated element and a channel element mounted on said elongated element and pivotally connected to said shaft engaging member, said elongated element extending along and being substantially equal in width to the web portion of said channel element and having a portion offset therefrom and cooperating with said channel element to provide a spring cage closed on four sides and at one end and opening at its other end toward said shaft engaging member, a channel-shaped roller supporting frame slidably mounted in and substantially fitting the end of said cage opening towards said shaft engaging member, a roller mounted in said frame and adapted to move along said cam, a coil spring disposed and substantially concealed within said cage, said spring being seated against said elongated element and engaging said frame to urge said roller along said cam to thereby urge said arm member in one direction in a plane which includes the axis of said shaft, and a spring guide mounted on the web portion of said channel-shaped frame and extending in opposed relation to the leg portions of said frame and axially into said coil spring.

EMIL E. SIVACEK.

REFERENCES CITED

The following references are of record in the file of this patent:

UNITED STATES PATENTS

| Number | Name | Date |
| --- | --- | --- |
| 1,786,210 | Lesperance | Dec. 23, 1930 |
| 1,920,145 | Hueber | July 25, 1933 |
| 1,950,157 | White | Mar. 6, 1934 |

FOREIGN PATENTS

| Number | Country | Date |
| --- | --- | --- |
| 279,096 | Italy | Oct. 30, 1930 |
| 404,442 | Great Britain | Jan. 18, 1934 |